US012336876B2

United States Patent
Dianat et al.

(10) Patent No.: US 12,336,876 B2
(45) Date of Patent: Jun. 24, 2025

(54) APPARATUS FOR MEASURING THE LENGTH OF ROOT CANAL AND A METHOD OF USE THEREOF

(71) Applicants: Seyed Omid Dianat, Lake Forest, CA (US); Mohammadreza Vatankhah, Los Angeles, CA (US)

(72) Inventors: Seyed Omid Dianat, Lake Forest, CA (US); Mohammadreza Vatankhah, Los Angeles, CA (US)

( * ) Notice: Subject to any disclaimer, the term of this patent is extended or adjusted under 35 U.S.C. 154(b) by 0 days.

(21) Appl. No.: 18/406,475

(22) Filed: Jan. 8, 2024

(65) Prior Publication Data
US 2024/0398529 A1    Dec. 5, 2024

Related U.S. Application Data

(60) Provisional application No. 63/506,187, filed on Jun. 5, 2023.

(51) Int. Cl.
*A61C 19/04* (2006.01)
*A61C 5/55* (2017.01)

(52) U.S. Cl.
CPC .............. *A61C 19/041* (2013.01); *A61C 5/55* (2017.02); *A61C 19/042* (2013.01)

(58) Field of Classification Search
CPC ........ A61C 19/041; A61C 19/042; A61C 5/55
See application file for complete search history.

(56) References Cited

U.S. PATENT DOCUMENTS

| | | | | |
|---|---|---|---|---|
| 3,753,434 A | * | 8/1973 | Pike | A61C 19/04 433/32 |
| 4,480,996 A | * | 11/1984 | Crovatto | A61C 5/50 433/32 |
| 4,525,147 A | * | 6/1985 | Pitz | A61C 5/50 433/224 |
| 4,527,560 A | * | 7/1985 | Masreliez | A61B 18/082 433/32 |
| 4,681,545 A | * | 7/1987 | Lapcevic | A61C 5/50 433/224 |
| 4,704,088 A | * | 11/1987 | Newman | A61C 5/55 433/81 |
| 4,992,045 A | * | 2/1991 | Beisel | A61C 5/50 433/32 |
| 5,112,224 A | * | 5/1992 | Shirota | A61C 5/40 600/589 |
| 5,595,486 A | * | 1/1997 | Manocha | A61C 13/30 433/224 |

(Continued)

FOREIGN PATENT DOCUMENTS

WO    WO-2013190539 A1 * 12/2013 ............... A61C 5/04

*Primary Examiner* — Cris L. Rodriguez
*Assistant Examiner* — Hao D Mai
(74) *Attorney, Agent, or Firm* — Barry Choobin; Patent 360

(57) ABSTRACT

A gutta percha point and an apparatus for measuring the length of a root canal in a root canal procedure. The gutta percha point includes a head, a neck, a body, and a tail. The neck has a coating of conductive material to which one electrode of the apparatus can be electrically clamped. The tip also includes a layer of conductive material. One or more conductive paths are formed integral to the body extending between the neck and the tail. The gutta percha cone can be used to measure the length of the root canal as well as for filling the tooth cavity.

16 Claims, 8 Drawing Sheets

(56) References Cited

U.S. PATENT DOCUMENTS

| | | | | |
|---|---|---|---|---|
| 6,270,343 B1* | 8/2001 | Martin | A61C 5/50 | 433/32 |
| 6,312,261 B1* | 11/2001 | Mays | A61C 5/50 | 433/32 |
| 6,520,773 B1* | 2/2003 | Weber | A61C 5/42 | 600/589 |
| 7,090,499 B1* | 8/2006 | Mays | A61C 5/40 | 433/81 |
| 8,398,403 B2* | 3/2013 | Nordin | A61C 5/42 | 433/220 |
| 8,602,779 B2* | 12/2013 | Simons | A61C 5/55 | 433/164 |
| 9,192,545 B2* | 11/2015 | Li | A61K 6/824 | |
| 2002/0081548 A1* | 6/2002 | Pina Lopez | A61C 5/50 | 433/32 |
| 2003/0064347 A1* | 4/2003 | Ahani | A61C 5/42 | 433/32 |
| 2004/0101809 A1* | 5/2004 | Weiss | A61C 19/06 | 433/32 |
| 2004/0265772 A1* | 12/2004 | Oh | A61C 5/50 | 433/32 |
| 2005/0003326 A1* | 1/2005 | Lampert | A61C 5/44 | 433/102 |
| 2005/0282116 A1* | 12/2005 | Kusano | A61K 6/54 | 433/224 |
| 2010/0209867 A1* | 8/2010 | Becker | A61C 5/50 | 433/32 |
| 2010/0297571 A1* | 11/2010 | Lee | A61C 5/50 | 433/32 |
| 2013/0122455 A1* | 5/2013 | Simons | A61C 5/50 | 433/32 |
| 2017/0071698 A1* | 3/2017 | Maretto | A61C 5/55 | |
| 2018/0353262 A1* | 12/2018 | Buchanan | A61C 5/55 | |
| 2019/0223982 A1* | 7/2019 | Li | A61C 5/50 | |
| 2020/0046459 A1* | 2/2020 | Ng | A61C 5/55 | |
| 2024/0074832 A1* | 3/2024 | Deo | A61B 18/08 | |

* cited by examiner

APPARATUS FOR MEASURING THE LENGTH OF ROOT CANAL AND A METHOD OF USE THEREOF

CROSS-REFERENCE TO RELATED APPLICATIONS

This application claims priority from a U.S. provisional patent application Ser. No. 63/506,187, filed on Jun. 5, 2023, which is incorporated herein by reference in its entirety.

FIELD OF INVENTION

The present invention relates to a system and method for measuring the length of a root canal, and more particularly, the present invention relates to an apparatus and method for determining the desired working length for root canal gutta-percha filling.

BACKGROUND

Root canal therapy is a routine dental treatment that involves the debridement of root canals from the dental pulp, shaping the canals, and filling the vacant space with root canal filling materials. This material should fill the canal space after the debridement to make a seal against saliva, food debris, and microorganisms. This filling process in endodontic treatments is called "obturation." Several materials have been used as endodontic obturation materials with different techniques and instruments. Dental gutta percha has been used in dentistry for over 150 years, and although several alternative materials with different ingredients and more complicated designs have been proposed throughout the past years, it remains a popular choice due to its biocompatibility, ease of use, and long-term stability. During a root canal treatment, the infected or inflamed pulp tissue is removed from the tooth, and the empty space is filled with gutta-percha to prevent bacteria from re-entering the canal. The gutta-percha is heated, softened, and then compacted into the canal using specialized instruments. Once the gutta-percha is placed, a dental filling or crown seals the tooth and restores its function.

In dentistry and endodontics, the term "working length" refers to the distance from the coronal (top) reference point to the apical (bottom) constriction or apex of a tooth's root canal. The extent of the obturation material should be limited to this length which ends at the apical foramen or anatomic apex, which separates the root environment from periodontium (the tissues around the tooth). The apical foramen is the point where the neurovascular bundle enters the root apex. However, identifying the accurate position of this foramen and thereby assessing the optimum working length is challenging in most cases since clinicians cannot directly observe it in patients.

If a correct length of root filling is not achieved, the filling could be either shorter (called underfilling) or longer (called overfilling) than the root canal's actual length. Both underfilling and overfilling strongly contribute to the failure of root canal treatments. The working length is typically determined using a combination of radiographs and electronic apex locators. The dentist will take an initial radiograph of the tooth to get a general idea of the length of the canal. However, radiographs depict a complex three-dimensional root canal system in a two-dimensional way, and since radiographic apex is usually different from anatomic apex, dentists deduct a fixed number, derived from population-based studies, from the radiographic apex position and use the calculated number as the optimum working length. Noting the fact that each individual canal possesses its own complexity and relying on a population-based amount is not precise, electrical diagnostic methods such as apex locators for locating the apical foramen were introduced and have since been routinely used. Nowadays, dentists use an electronic apex locator to refine the measurement of a primary radiograph and determine the exact location of the apex.

An apex locator device is a device used in dentistry to determine the length of a tooth's root canal. The structure of the root canal walls possesses a resistance to electrical current. On the other hand, the current can pass through the periodontium. By using an electrical conductor coupled to a power source and current meter, apex locators can detect the difference in the resistance between an electric insulator (root canal walls) and an electric conductor (periodontium) in the apical foramen. An apex locator uses a small electrical current to determine the position of the root tip and the length of the canal. The device is connected to a file or instrument that is inserted into the canal, and the electrical signal is transmitted through the tooth and surrounding tissues. Therefore, apex locators can identify the apical foramen with precision, and it is usually used alone or in combination with radiographs as further confirmation.

U.S. Pat. No. 3,916,529 describes an instrument having a probe in the form of a thin, flexible metal wire which is introduced into the root canal of the tooth until the probe's tip reaches the root apex. In a preliminary or calibration step, the probe is placed at the juncture of soft gum tissue and the tooth, with a conductor member held in electrical contact with the patient's lip. The probe and conductor member are electrically coupled to an electrical unit having a current meter which indicates the same reading as that obtained in the calibration step when the probe has penetrated the tooth to the apex thereof. The electrical unit may also include a silicon-controlled rectifier (SCR) and an electric lamp adapted to be lighted upon conduction of the SCR because of the tip of the probe having reached the root apex. However, there are major drawbacks to using metal wires or endodontic files with apex locator systems.

Another PCT Appl. No. WO2013181105A1 describes an electrically conductive dental endodontic point device constructed from a hydrophilic polymer housing having a proximal end and a distal end with an elongated electrically conductive shaft placed therebetween. In a preferred embodiment, the electrically conductive shaft is a gold filament or grapheme internally disposed within the length of the endodontic shaft. The improved endodontic point housing has a conical cross-section with the proximal end attached to an apex locator and the distal end constructed and arranged to act as a probe tip to measure the length of a root canal.

Shortly before the root-filling step, practitioners assess the final root-filling length by electrical and/or radiographic measures. After that, they use the same length to fill the root canals, without any other confirmation during the root filling step. All the techniques that are nowadays used to detect the location of apical foramen, including PCT Appl. No. WO2013181195A1 and U.S. Pat. No. 3,916,529, are employed "before" the obturation procedure. This puts forth a risk of underfilling or overfilling since the obturation process itself could go wrong without any active length-controlling measures. For instance, a correct obturation length may be determined by the apex locator, but the obturation material such as gutta-percha goes beyond the apical foramen because of its traction or anatomical complications. Since there is no visible control over the obturation length, overfilling or underfilling can happen in such cases. To ensure that the length of the filling is appropriate, practitioners frequently take radiographs in between steps or, more importantly, at the end of the root canal filling process. However, the very first reason for using apex locators was to account for the shortcomings of radiography, and using radiography to confirm whether apex locators were precise or not seems redundant and inconclusive. Furthermore, exposing patients to several radiographs to this aim seems unnecessary.

Known devices cannot be used in root-filling materials, such as gutta-percha during the obturation process for determining the correct and exact working length. It would, therefore, be desirable to have an apparatus and method to use as the correct root-filling length indicator that can be conveniently used before and during the root-filling step.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

It is, therefore, a primary object of this invention to provide an apparatus for determining the obturation length of a root canal to overcome the above-mentioned drawbacks.

It is another object of the present invention that the apparatus can determine obturation length before and during the obturation process.

It is still another object of this that gutta-percha can be used as both the indicators of root-filling length and root-filling material.

It is yet another object of this invention that the apparatus is convenient to use.

In one aspect, disclosed is a gutta-percha point that conducts electricity.

In one aspect, disclosed is an apparatus comprising a Gutta Percha point, wherein the Gutta Percha point conducts electricity.

In one aspect, disclosed is a gutta percha point for determining a length of root canal and simultaneously filling tooth cavity, the gutta percha point comprising a head; a neck, wherein the neck has a conductive layer thereon; a tail, wherein a tip of the tail has a conductive layer thereon; and a body extends between the neck and the tail, wherein one or more conductive paths are formed on the body extending between the conductive layer of the neck and the conductive layer of the tip. Each of the one or more conductive paths are of a thin and linear profile. The one or more conductive paths comprise four conductive paths. The one or more conductive paths are of a thin and spiral profile. The one or more conductive paths comprise a coating of conductive material on an exposed surface of the body.

In one aspect, disclosed is an apparatus for determining a length of root canal and simultaneously filing the root canal in a root canal procedure, the apparatus comprises a gutta percha point. The gutta percha point comprises a head, a neck, wherein the neck has a conductive layer thereon, a tail, wherein a tip of the tail has a conductive layer thereon, and a body extends between the neck and the tail, wherein one or more conductive paths are formed on the body extending between the conductive layer of the neck and the conductive layer of the tip. The apparatus includes an apex locator device, wherein a first electrode extends from the apex locator device and is configured to electrically connect to the neck of the gutta percha point, and a second electrode extends from the apex locator device and is configured to attach to a body tissue.

BRIEF DESCRIPTION OF DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Disclosed is an apparatus for use in endodontics. The disclosed apparatus is used for root canal procedures, wherein the filling of the tooth after the root canal procedure is done by gutta-percha composition. The disclosed apparatus can be used for measuring the length of the root canal for filling. The length could be measured while filling, thus providing real-time measurements. The disclosed apparatus can help in reducing the chance of discrepancies that might occur while filling and using the probe.

Figure 1:
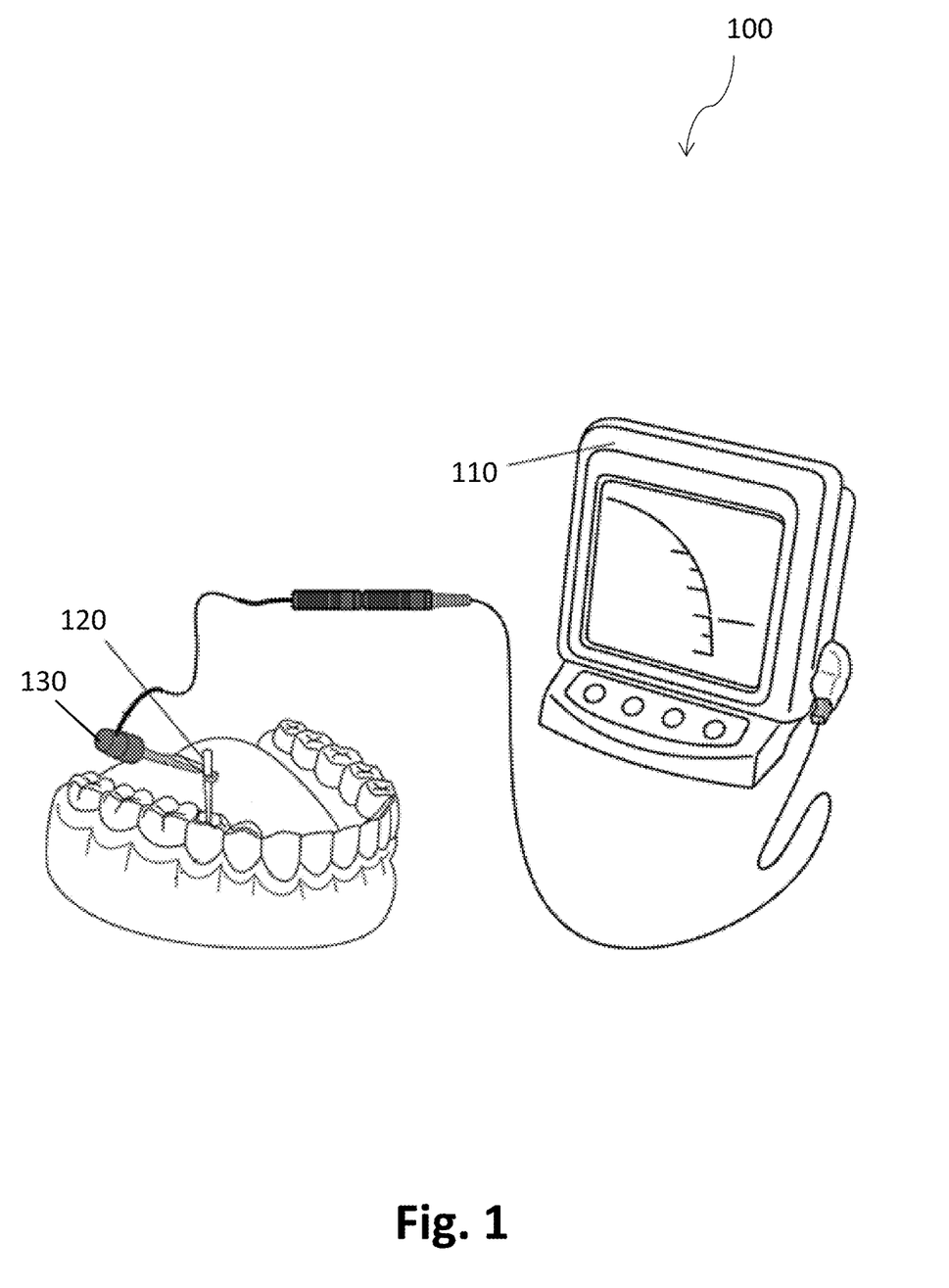
FIG. 1 is a schematic diagram illustrating the apparatus in a use condition, according to an exemplary embodiment of the present invention.
Figure 2:
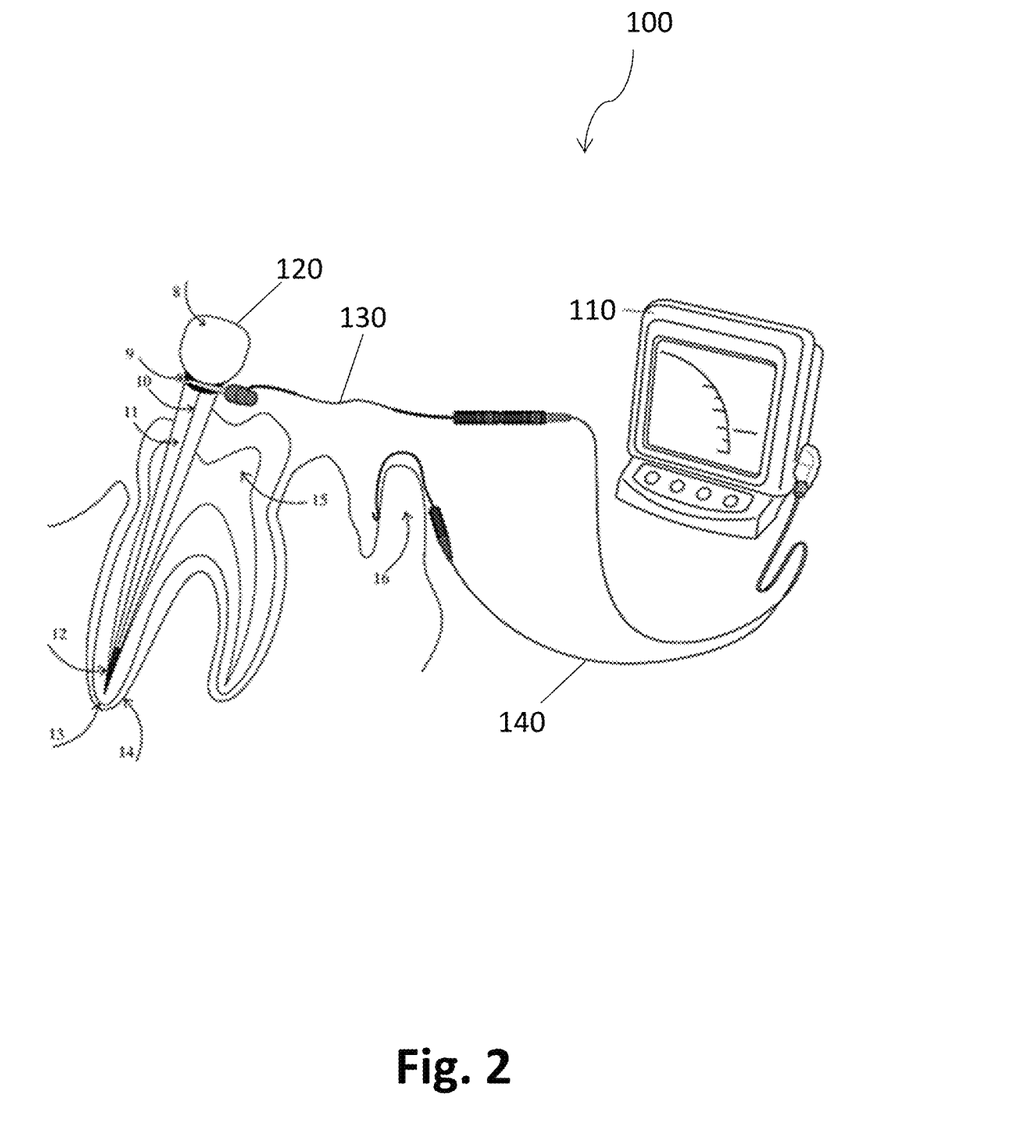
FIG. 2 illustrates the gutta Percha point inserted into the root canal, according to an exemplary embodiment of the present invention.

Disclosed is a gutta percha point that conducts electricity and can be used for filling the tooth as well as a probe to determine the length of the root canal. Referring to FIGS. 1 and 2, which show an exemplary embodiment of the present invention. The disclosed apparatus 100 includes an apex locator device 110, a gutta percha point 120, a first electrode 130 that extends from the apex locator device and is configured to electrically couple to a neck of the gutta percha pointer, and a second electrode 140 extending from the apex locator device that is configured to couple to body tissue, such as lips. FIGS. 1 and 2 show the gutta percha point placed in a lower premolar tooth root. The first electrode, the disclosed gutta percha point, the body tissue, and the second electrode form a conductive path. The difference of the electric current at the apical foramen can be detected by the apex locator device and the length of the root canal can be derived accordingly. FIG. 2 shows the gutta percha point 120 having a head 8, a neck 9, a body 11, a conductive path 10 in the body, and a tail 12 of the gutta percha. The tip of the tail 12 of the gutta percha point 120 is shown touching the periodontium 13 of the lower premolar tooth root 14.

Referring to FIGS. 3-8 which show embodiments of the gutta percha point according to the present invention. The disclosed gutta percha point is mainly composed of gutta percha composition. The disclosed gutta percha point includes a head, neck, body, and tail. The head can be used to identify the size of the material which will be used in different steps of the obturation process or different canals with various sizes. The neck is used to connect to the apex locator through the apex locator clip. The body comprises several surface modifications to pass the current throughout the whole device. The tail can touch the anatomical apex and the whole neck-body-tail complex can act as an open electric circuit. When the tail, also referred to herein as the tip, touches the periodontium, the electric circuit gets complete, and the current can flow. Thus, there is no need for a separate probe or endodontics file for length measurement at the time of root canal filling.

The neck could have a conductor layer that contacts the first electrode of the apex locator device. Similarly, the tip or tail of the gutta percha has a coating of conductive material. The tail part touches the apical foramen and provides a conductive path. A conductive path can be formed between the neck and the tail on the body part of the gutta percha pointer. The conductive path on the body can be provided in a variety of ways as shown in the drawings.

In one implementation, the conductive material can be made of silver, copper, gold, aluminum, iron, steel, brass, bronze, mercury, graphite, boron, gallium, germanium, silicon, phosphorus, selenium, titanium, or any other conductive material including a combination of materials, such as alloys. For the conductive path, semiconductors can also be used. Preferably, the conductive material can be bio-compatible and safe for use in humans. It is to be noted that any such conductive material may also need to be certified by a suitable agency for use in humans. Moreover, the amount of conductive material can be very less by having thinner and narrow coatings.

The use of gutta percha has several advantages. Gutta-percha points, also referred to herein as gutta percha cones, are mainly composed of gutta percha material. The disclosed gutta percha point can be manufactured in a range of sizes. To fill the root canal, the dentist can select a gutta-percha point that is of the correct size and taper for the canal to go to the actual working length of the canal. The gutta percha point can then be inserted into the canal and heated with a special instrument. The heat causes the disclosed gutta-percha to soften and conform to the shape of the canal. Once the disclosed gutta percha is in place, it can be usually sealed with a root canal sealer. The sealer helps to prevent bacteria from entering the root canal and causing an infection. The obturation length can be determined by the disclosed gutta percha point. The tail covered in the prepared pulpal cavity, and the conductivity difference between the dentinal wall of the apex and periodontium 9 can be sensed by the apex locator. Another wire is attached to the lip 3 of the patient to make a closed circuit of the apex locator device.

Figure 3:
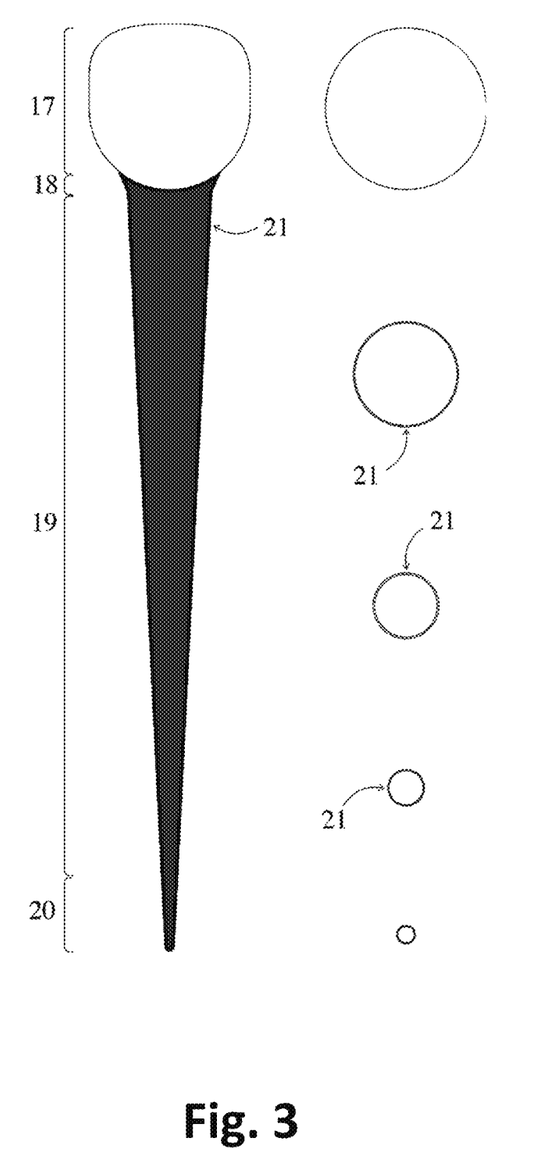
FIG. 3 illustrates the gutta Percha point, according to an exemplary embodiment of the present invention.

FIG. 3 shows a head 17, a neck 18, a body 19, and a tail 20 of the gutta percha point. The sections on the right side of the figure represent the horizontal cross-sections of the material, as the coating material 21 can be seen from both lateral and cross-sectional aspects. In this figure, the head neck, body, and tail are coated with a conductive or semi-conductive material 21.

Figure 4:
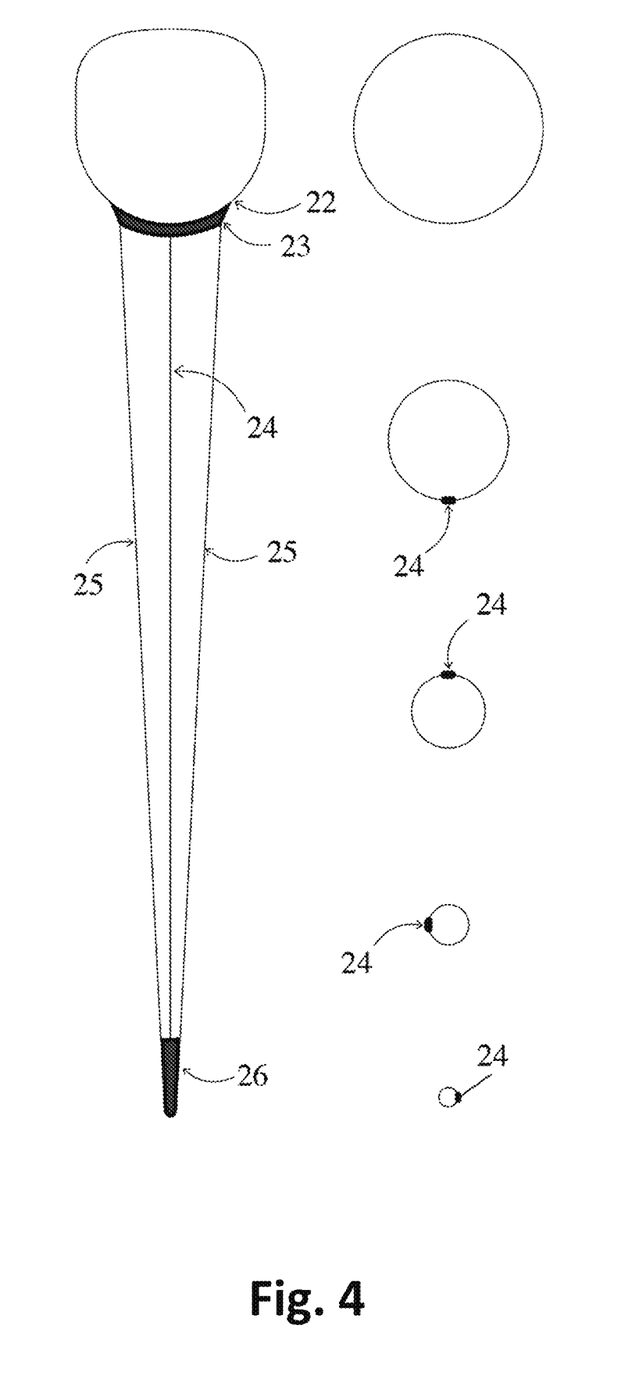
FIG. 4 illustrates coating on the gutta percha point, according to an exemplary embodiment of the present invention.

FIG. 4 shows another embodiment of the gutta percha point that includes a head 22, a neck 23, a body 25, a tail 26, and the conductive path 24. The conductive path is in the form of a thin wire pattern that extends from the neck to the tail.

Figure 5:
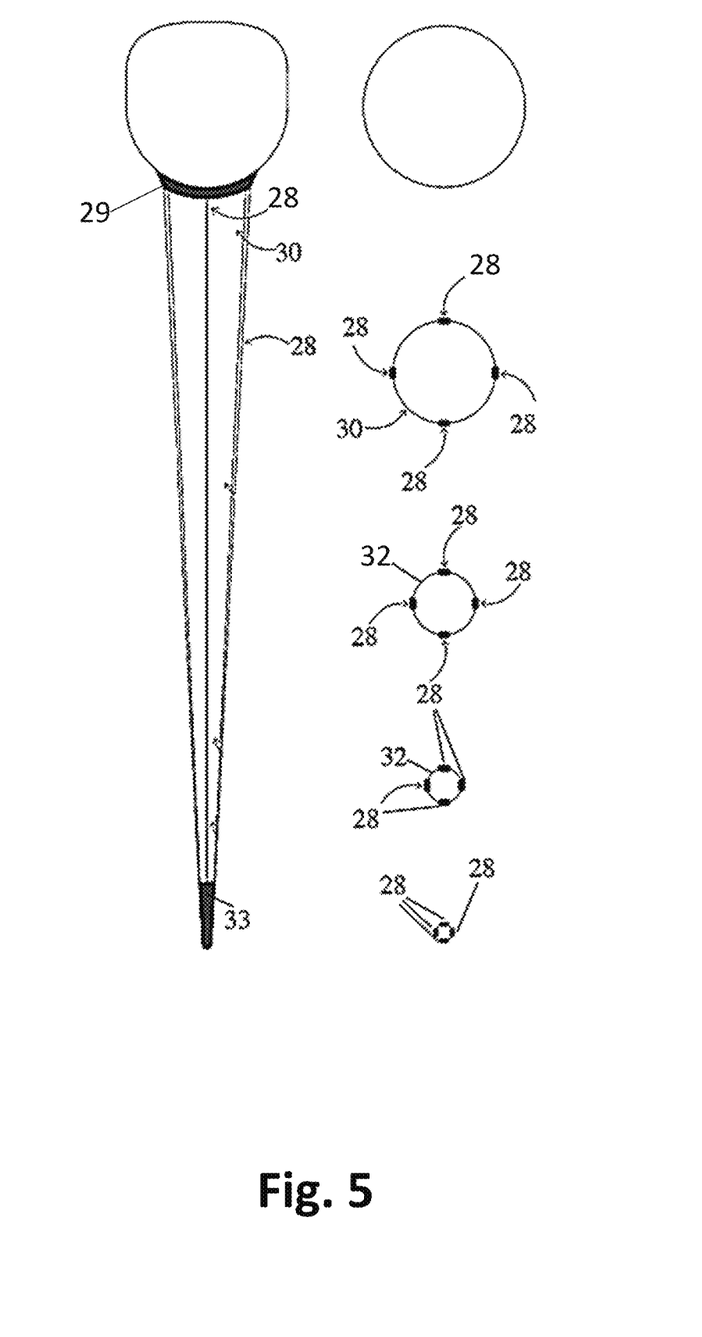
FIG. 5 illustrates the structure of gutta percha point, according to an exemplary embodiment of the present invention.

More than one conductive path line can be added as depicted in FIG. 5. Multiple linear conductive paths extend between the neck and the tail, FIG. 5 shows a neck, a body 30 and tail 33, and four conductive paths 28 extend between the neck 29 and tail 33. The conductive paths are linear and thin in profile.

Figure 7A:
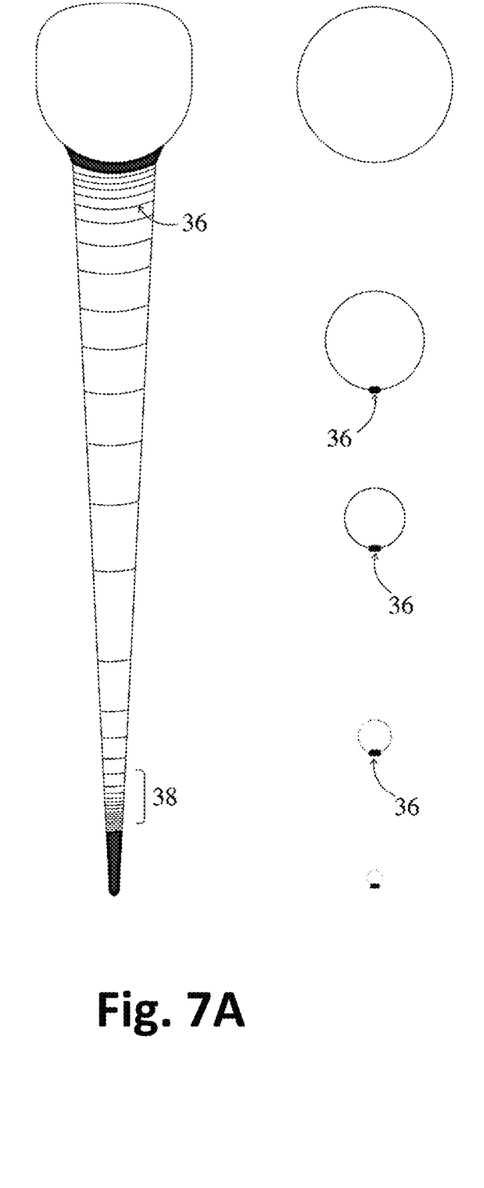
FIGS. 7A and 7B show other implementations of the gutta percha point, according to an exemplary embodiment of the present invention.
Figure 7B:
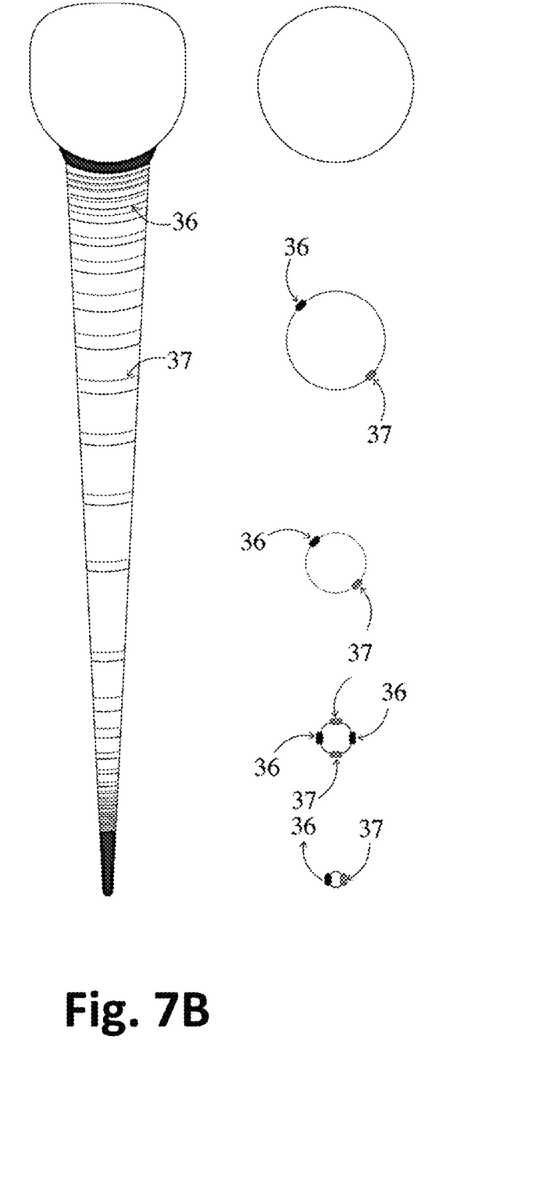

FIG. 7A shows spiral conductive path 36 and FIG. 7B shows another pattern of the spiral conductive path 37. The space between these spirals may be reduced incrementally towards the tail 38.

Figure 6:
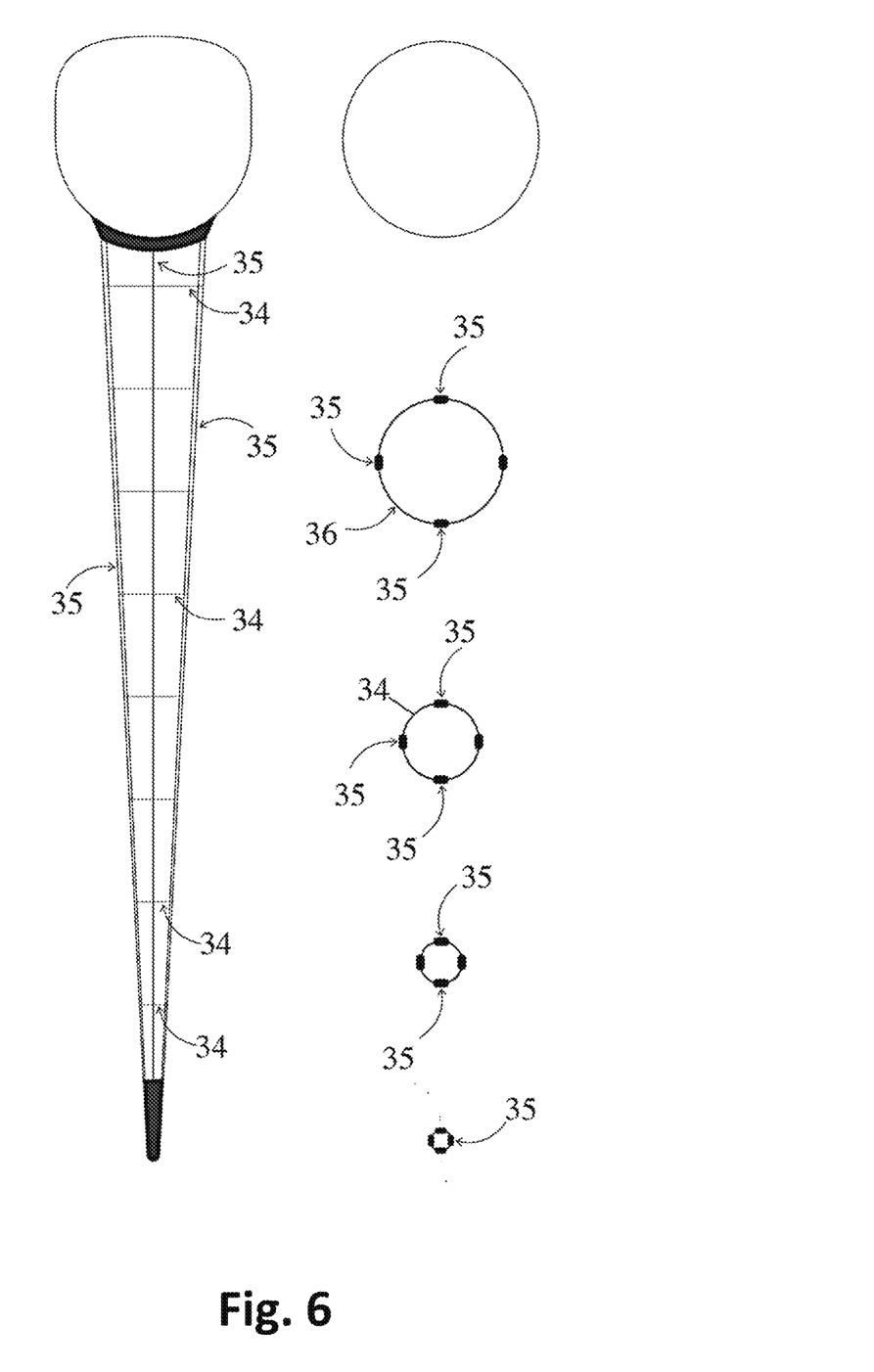
FIG. 6 illustrates another implementation of the gutta percha point, according to an exemplary embodiment of the present invention.

FIG. 6 shows the gutta percha point having the linear conductive path 35 configured in the body 19 and circular conductive paths 34 are provided spaced apart from each other and disposed along a length of the body. The use of multiple conductive paths can be advantageous when one conductive path may get damaged or deformed during the process. Multiple conductive paths dispersed evenly can provide more contact points easing the process. Also, certain patterns, such as spiral may be easy to manufacture. Thus, optimum conductive paths can be made as desired, and any such conductive path is within the scope of the present invention.

Figure 8:
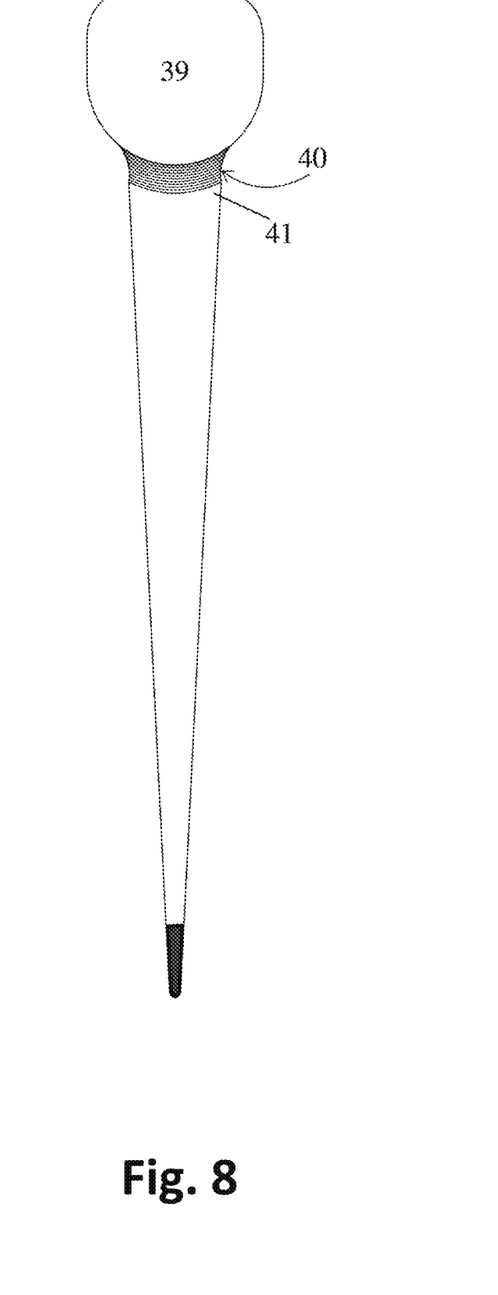
FIG. 8 shows another implementation of the gutta percha point, according to an exemplary embodiment of the present invention.

FIG. 8 shows another implementation of the gutta percha point. A depression in the neck part 40, or with a minimal distance from the upper and lower part of the neck can ease the attachment of apex locator tips to the invention. Bulging the head 39 and upper parts of the body 41 can also have the same effect.

In one implementation, for filling the root canal space, a main gutta-percha cone can be selected based on the final size of prepared canal. And then the gutta-percha cone can be coated with sealers and then inserted into the canal. At this point, the electronic apex locator, according to the present invention, can be utilized to confirm the accurate working length. The excessive gutta percha cone can be removed, and the gutta percha cone can then be condensed.

In certain implementations, the conductive material can be applied as a coating on the outer surface of the gutta percha cone. Also, the conductive material can be doped into the material of the gutta percha, such as by mixing during the manufacture of the gutta percha. Conductive paths can also pass through the gutta percha cone.

In certain implementations, a depression (groove) can be made in the body along the length thereof. In the depression, conducting material can be filled in such that the outer surface of the body remains even and smooth. The coating or filling of the conducting material may not protrude from the body surface. This may ensure that the filling material maintains a consistent diameter as in traditional gutta-percha without any overhangs resulting from the coating.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A gutta percha point for determining a length of a root canal in real-time while filling, and simultaneously filling a tooth cavity, the gutta percha point consisting of:
   a head, wherein the head does not have any conducting material;
   a neck, wherein an outer surface of the neck has a first conductive layer thereon, the neck has a depression;
   a tail, wherein a tip of the tail has a second conductive layer thereon; and
   a body extends between the neck and the tail, wherein one or more conductive paths are formed on an outer surface of the body extending between the first conductive layer of the neck and the second conductive layer of the tip, wherein one or more conducting paths are integral with the body, wherein a diameter of the head is more than that of the neck and the body.

2. The gutta percha point according to claim 1, wherein each of the one or more conductive paths are of a thin and linear profile.

3. The gutta percha point according to claim 2, wherein the one or more conductive paths comprise four conductive paths spaced apart from each other.

4. The gutta percha point according to claim 1, wherein the one or more conductive paths are of a thin and spiral profile, wherein space between spirals reduces incrementally towards the tail.

5. The gutta percha point according to claim 1, wherein the one or more conductive paths comprise a coating of conductive material on an outer surface of the body.

6. An apparatus for determining a length of a root canal and simultaneously filing the root canal in a root canal procedure, the apparatus comprises:
   a gutta percha point consisting of:
      a head, wherein the head does not have any conducting material;
      a neck, wherein an outer surface of the neck has a first conductive layer thereon, the neck has a depression;
      a tail, wherein a tip of the tail has a second conductive layer thereon; and
      a body extends between the neck and the tail, wherein one or more conductive paths are formed on an outer surface of the body extending between the first conductive layer of the neck and the second conductive layer of the tip, wherein one or more conducting paths are integral with the body, wherein a diameter of the head is more than that of the neck and the body; and
   an apex locator device, a first electrode extends from the apex locator device and is configured to electrically connect to the neck of the gutta percha point, and a second electrode extends from the apex locator device and is configured to attach to a body tissue.

7. The apparatus according to claim 6, wherein each of the one or more conductive paths are of a thin and linear profile.

8. The apparatus according to claim 7, wherein the one or more conductive paths comprise four conductive paths spaced apart from each other.

9. The apparatus according to claim 6, wherein the one or more conductive paths are of a thin and spiral profile, wherein space between spirals reduces incrementally towards the tail.

10. The apparatus according to claim 6, wherein the one or more conductive paths comprise a coating of conductive material on an outer surface of the body.

11. The gutta percha point according to claim 1, wherein the body comprises an elongated groove along a length of the body, wherein the elongated grove has conductive material filled into the elongated groove forming at least one conducting path of the one or more conductive paths such that an outer surface of the body remains even and smooth.

12. A method for determining a length of a root canal and simultaneously filling the root canal in a root canal procedure, the method comprises:
   providing an apparatus comprising:
      a gutta percha point comprising:
         a head, wherein the head does not have any conducting material;
         a neck, wherein an outer surface of the neck has a first conductive layer thereon, the neck has a depression;
         a tail, wherein a tip of the tail has a second conductive layer thereon; and
         a body extends between the neck and the tail, wherein one or more conductive paths are formed on an outer surface of the body extending between the first conductive layer of the neck and the second conductive layer of the tip, wherein one or more conducting paths are integral with the body; and an apex locator device, a first electrode extends from the apex locator device and is configured to electrically connect to the neck of the gutta percha point, and a second electrode extends from the apex locator device and is configured to attach to a body tissue, wherein a diameter of the head is more than that of the neck and the body;

attaching the first electrode to the neck of the gutta percha point;

attaching the second electrode to the body tissue;

inserting the gutta percha point into a canal;

confirming accurate working length; and heating the gutta percha point so that the gutta percha point gets softened and conforms to a shape of the canal.

13. The method according to claim 12, wherein each of the one or more conductive paths are of a thin and linear profile.

14. The method according to claim 13, wherein the one or more conductive paths comprise four conductive paths spaced apart from each other.

15. The method according to claim 12, wherein the one or more conductive paths are of a thin and spiral profile, wherein space between spirals reduces incrementally towards the tail.

16. The method according to claim 12, wherein the one or more conductive paths comprise a coating of conductive material on an outer surface of the body.

\* \* \* \* \*